UNITED STATES PATENT OFFICE.

JOHN HELM, JR., OF NEW BRUNSWICK, NEW JERSEY.

IMPROVEMENT IN BLEACHING RUBBER, GUTTA-PERCHA, &c.

Specification forming part of Letters Patent No. 115,202, dated May 23, 1871.

*To all whom it may concern:*

Be it known that I, JOHN HELM, Jr., of New Brunswick, in the county of Middlesex and State of New Jersey, have invented a new and useful Improvement in the Manufacture of India Rubber, Gutta-Percha, and their allied Gums with Chlorine; and I do hereby declare that the following is a full, clear, and exact description of the same.

This invention consists in the treatment of India rubber, gutta-percha, and their allied gums for the production of hard compounds, either in the solid state or in solution, and either alone or mixed with other substances, with chlorine-water or liquid chlorine, by which means I am enabled to produce a cheaper compound, as I obviate the waste of chlorine which occurs by its escape when it is used in the gaseous state; and when the gum is treated in solution I am enabled to use the cheaper solvents, as benzine and gasoline.

To treat the gum in the solid or undissolved state, I put it in small lumps or thin sheets in a suitable vessel with chlorine-water, or chlorine liquefied by pressure or other means, which causes it to swell and turn to a white brittle mass, which, after washing with water and dried, I press in molds of suitable form, heated to from 125° to 212° Fahrenheit, in which it forms a white hard mass. In case of any free acid having been formed in the gum by the treatment with the liquid chlorine or chlorine-water it should, before being washed with water, be treated to washing in an alkaline—potash or soda—solution of sufficient strength to neutralize the acid.

When I treat the gum in solution I first dissolve it in any of its well-known solvents, preferably gasoline or benzine, on account of their cheapness, and in that state put it into a suitable vessel with the liquid chlorine or chlorine-water, and stir or triturate the whole to bring all particles of it in contact with the chlorine, during which treatment the mass becomes gradually thicker by the solvent leaving the rubber as the chlorine combines with it until the compound of gum and chlorine precipitates in a white powder of more or less fineness or in lamina. This precipitate I then wash with water, or first with a solution of alkali and afterward with water, and afterward dry, and when dry I press it into any desired shape in warm molds, in which it forms, as when treated in the solid state, a white hard mass.

The treatment of the gum with chlorine-water in solution may be performed by trituration in a mortar, or by stirring in an apparatus like a wash-tub, but covered, the latter being preferable for treatment in large quantities, though leaving it in a laminar state, and requiring it to be subsequently ground in some suitable mill—such, for instance, as a grist-mill—into a fine powder. During this grinding the gum, in case of its not all having been thoroughly combined with chlorine, may be subjected to the action of chlorine-water, by which its combination will be perfected.

In case the gum be treated with liquid chlorine the apparatus used must be so constructed as to permit the treatment to be performed under a pressure of four or five atmospheres, or sufficient to keep the chlorine in a liquid state. If the process be performed in this way little or no stirring will be needed.

Before the treatment of the gum with the chlorine-water or liquid chlorine I usually mix with it some foreign matter—such, for instance, as oxide of zinc, Paris white, terra alba, ground glass, or lime—for the purpose of cheapening the product or rendering it more or less dense, as may be required, the quantity of such foreign matter being greater or lesser according as a more or less dense product is desired.

When the treatment is by chlorine-water the water should be as nearly saturated as practicable, and the quantity may be from twenty to forty gallons to every pound of gum, though these limits of quantity may not be absolutely essential to the success of the process.

When the treatment is by liquid chlorine the quantity used may be about twelve ounces of chlorine to the pound of gum.

The product of this process may be variously colored by the addition of suitable coloring matters added to the solution before treating with the chlorine, or dyeing the powder, after treatment with chlorine, with aniline or other dyes.

What I claim as my invention, and desire to secure by Letters Patent, is—

The treatment of India rubber, gutta-percha, or other allied gums with chlorine in a liquid form or in solution, substantially as and for the purpose herein described.

JOHN HELM, Jr.

Witnesses:
FRED. HAYNES,
R. E. RABEAU.